Dec. 29, 1931.　　　　G. S. FABER　　　　1,838,377
COMBINATION CIRCUIT CONTROLLER AND INDICATING MECHANISM
Filed Nov. 30, 1928　　4 Sheets-Sheet 1

Witness:
William P. Kilroy

Inventor:
Guy S. Faber
Hill & Hill
Attys

Dec. 29, 1931.  G. S. FABER  1,838,377
COMBINATION CIRCUIT CONTROLLER AND INDICATING MECHANISM
Filed Nov. 30, 1928  4 Sheets-Sheet 2

Witness:
William P. Kilroy

Inventor.
Guy S. Faber
Hill & Hill
Attys

Dec. 29, 1931.  G. S. FABER  1,838,377
COMBINATION CIRCUIT CONTROLLER AND INDICATING MECHANISM
Filed Nov. 30, 1928   4 Sheets-Sheet 3
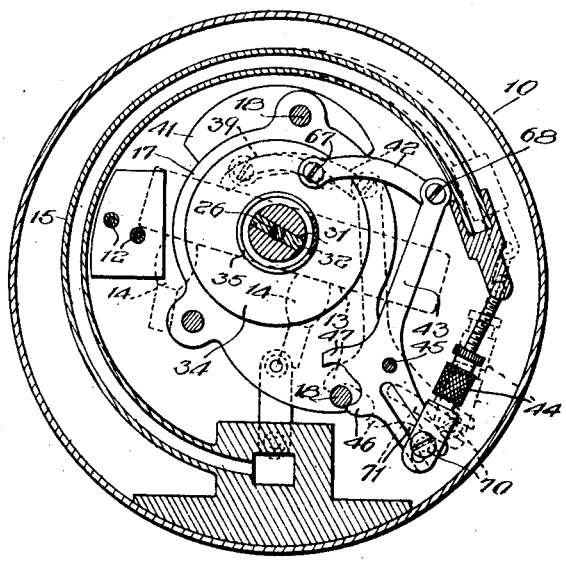
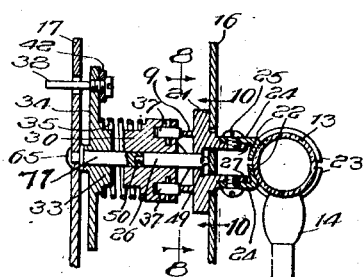
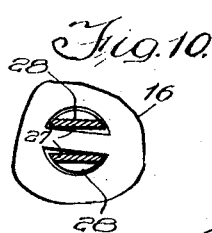
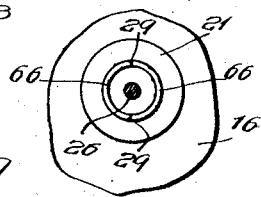
Witness:
William P. Kilroy
Inventor:
Guy S. Faber
Hill & Hill
Attys Dec. 29, 1931.  G. S. FABER  1,838,377
COMBINATION CIRCUIT CONTROLLER AND INDICATING MECHANISM
Filed Nov. 30, 1928  4 Sheets-Sheet 4

Witness:
William P. Kilroy

Inventor:
Guy S. Faber
Hill & Hill
Attys

Patented Dec. 29, 1931

1,838,377

UNITED STATES PATENT OFFICE

GUY S. FABER, OF CHICAGO, ILLINOIS, ASSIGNOR TO JAS. P. MARSH & COMPANY, OF CHICAGO, ILLINOIS, A CORPORATION OF ILLINOIS

COMBINATION CIRCUIT CONTROLLER AND INDICATING MECHANISM

Application filed November 30, 1928. Serial No. 322,906.

My invention relates to a combination circuit controller and indicating mechanism and more particularly it relates to a combined impulse action and indicating device adapted for use with refrigerating apparatus, air compressors, or any fluid actuated mechanism wherein it is desirable to maintain a control of the fluid pressure under ascertainable conditions.

The invention has among its objects the production of a safety device that will indicate pressure conditions under which the same is working, as well as a device operable to control an electric circuit upon variation in conditions between desired limits.

Another object is the production of a device in which the mechanism controlling the circuit and the pressure indicating mechanism are directly related whereby the failure of either the circuit controlling mechanism or of the indicating mechanism to function will immediately become apparent.

A further object of the invention is the production of a device of the kind described that is simple, compact, efficient, and satisfactory.

Many other objects and advantages of the construction herein shown and described will be obvious to those skilled in the art from the disclosure herein given.

To this end my invention consists in the novel construction, arrangement and combination of parts herein shown and described and more particularly pointed out in the claims.

In the drawings, wherein like reference characters indicate like or corresponding parts:

Fig. 6 is a view along the line 6—6 of Fig. 4;

Fig. 7 is a view along the line 7—7 of Fig. 2;

Fig. 8 is a view along the line 8—8 of Fig. 7;

Fig. 9 is view on the line 9—9 of Fig. 3;

Fig. 10 is a view on the line 10—10 of Fig. 7; and

Figure 1:
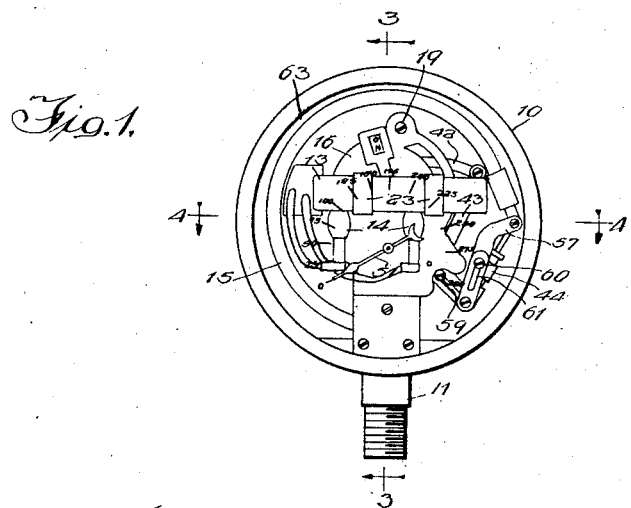
Fig. 1 is an elevational view of my assembled device.
Figure 2:
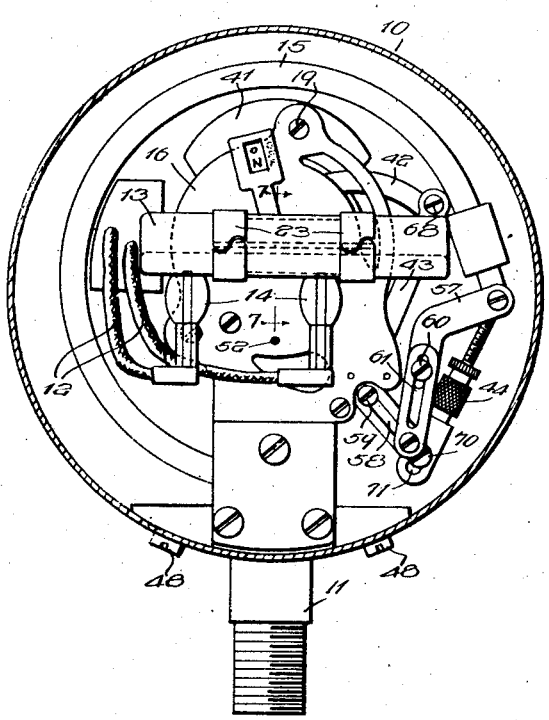
Fig. 2 is a view along the line 2—2 of Fig. 3.

Referring to the drawings, 10 represents a casing containing a device adapted to indicate the correct fluid pressure over a wide range in a system to which the device is attached. The casing also contains an instantaneous impulse movement combined with the pressure indicating device. The instantaneous impulse movement is operable, at predetermined points of pressure within the aforesaid mentioned range, to open and close an electrical circuit which controls the pressure system.

The casing 10 is provided with a tubular stem 11 which is adapted for attaching the casing to any desired fluid pressure system. The casing 10 is also provided with a pair of electrical conductors 12 which may extend to and connect the casing with an electrical circuit which controls the pressure system to which the casing is attached.

The instantaneous impulse movement includes a circuit breaking device consisting of a mercury tube 13 which may be constructed of glass or of any other suitable non-conducting material. A pair of contacts 14 are positioned in the bottom of the tube 13 and the conductors 12 are suitably connected therewith. When the tube 13 is in horizontal position the mercury electrically connects the contacts 14, and when the tube is in tilted position the circuit is broken between the contacts. Since the conductors 12 are connected with the contacts 14 the circuit, of which the conductors form a part, is broken when the tube 13 is tilted and is closed when the tube is in horizontal position. The circuit which includes the conductors 12 may be operatively connected with or in control of any desired energy system such, for example, as an ammonia ice machine of a refrigerating plant wherein the mercury tube impulse action is set to break the circuit when the pressure reaches about 255 pounds. The breaking of the circuit is checked by the gauge indicating mechanism included in the same instrument. It is to be understood that this is only one of many ways in which the circuit breaker combined with an electrical circuit might be put in control of an energy or pressure system.

Figure 5:
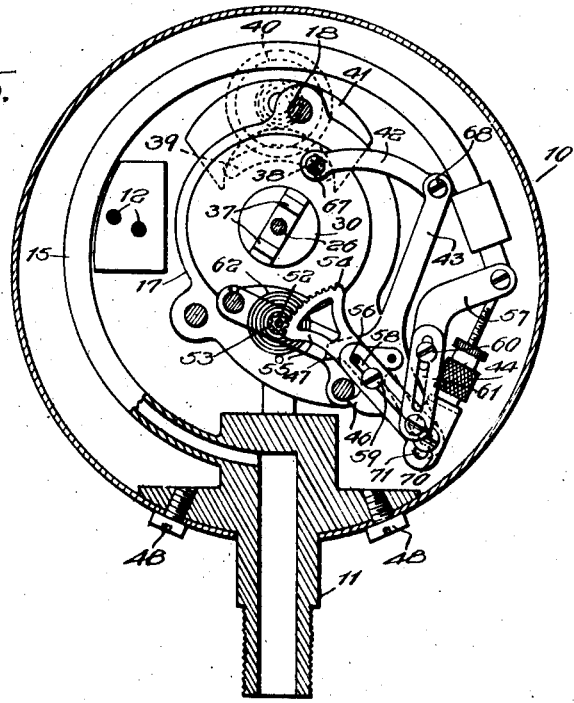
Fig. 5 is a view along the line 5—5 of Fig. 4.

In the embodiment illustrated, the rocking of the mercury tube 13 is controlled by fluid pressure which is exerted on a Bourdon tube 15. The stem 11 is connected with the Bourdon tube 15 as is best shown in Fig. 5, the stem being fastened to the casing 10 by screws 48. The Bourdon tube 15 is adapted to be connected with any pressure energy system by means of the stem 11 through pipes (not shown). The Bourdon tube 15, by reason of such connection with an energy system will be actuated in accordance with the pressure in the system at the particular points with which the tube is connected. An increase of pressure in the system at the point of connection will tend to straighten out the tube and move its free end outwardly from the full line position of Fig. 6 in the direction of the dotted line position. A falling off of the pressure in the tube 15 will produce the opposite effect, that is, will cause a contraction of the tube and an inward movement of the free end. It is obvious that this movement of the Bourdon tube 15 under changes in pressure existing in the system with which it is connected will be rather gradual or slow. Since the movement of tube 15 is to be utilized for the purpose of opening and closing an electrical circuit, it is necessary that its normal slow gradual movement shall be transferred into an impulsive movement as it is highly undesirable that an electric circuit be broken slowly or by degrees as would be the case if the circuit breaking switch were directly connected to the Bourdon tubes. The transformation of the relatively slow or gradual movement of the Bourdon tube 15 into an impulsive movement is accomplished by means of mechanism connecting the tube 15 with the mercury tube 13. I have provided mechanism suitable for this purpose which is mounted on a frame comprising vertical plate members 16 and 17 separated by spacers 18. A plurality of bolts 19 extend through the spacers and fasten the plate members 16 and 17 together, thereby forming a rigid frame support.

The mercury tube 13 is mounted on a carrier member 20 which is positioned on the outer side of the frame or plate member 16 and is connected with a disk 21 which is suitably positioned on the inner side of the plate member 16. The carrier member 20 comprises a pair of bars or plates 22 each of the bars having a pair of forwardly extending semi-circular arms 23 which firmly grip the mercury tube 13. Each of the bars 22 also has a backwardly turned stem 24 which projects from its midportion. The disk 21 is provided with a pair of fingers 27 which project through the plate member 16 and engage the stems 24.

The disk 21 is fixedly mounted on a revolvable shaft or pin 26. One end of the shaft 26 has a spherical projection 49 forming a ball bearing in contact with the plate 16 and the other end of the shaft is offset to form a pin 50 which projects into and is journalled in a socket in the end of a stationary stud shaft 77. The shafts 26 and 77 are in longitudinal alignment, the shaft 77 being fastened to the plate 17 by means of a screw bolt 65 or any other means suitable for rigidly connecting the shaft to the plate.

The plate member 16 is provided with a pair of slots 28 through each of which one of the fingers 27 projects. The fingers 27 may be integrally formed with or otherwise fastened to the disk 21 and are connected to the stems 24 by means of screws 25, thereby fixedly connecting the disk 21 to the mercury tube 13 and its mounting, or carrier member 20. As a result of this fixed connection between the mercury tube 13 and the disk 21 the tube and the disk must rotate together. The edges of the slots 28 provide stops which are shaped and spaced to permit a limited movement of the fingers 27 therein, and thereby control the amount of rotation to which the mercury tube 13 may be subjected. The slots 28 are inclined to the horizontal, as is best shown in Fig. 10, this inclination being of such character as to limit the movement of the tube 13 so that it cannot go past the horizontal when turned in counter-clockwise direction as viewed in Fig. 10, but may be tilted to the position of the tube as shown in Fig. 6.

On the inner face of the disk 21 I have provided an annular flange 9 on the free end of which I have formed diametrically oppositely positioned cam projections 29 separated by concave depressions 66.

The oppositely positioned concave depressions 66 in the annular flange 9 between the cam projections 29 form curved tracks for a pair of rollers 37 which are oppositely mounted on a sleeve 30. The sleeve 30 is slidably mounted on the shafts 26 and 77 and is provided with diametrically opposed longitudinally extending slots 31 into which arms 32 extend. The arms 32 are rigidly fastened to and project from a hub 33 of a drum 34 which is rotatably mounted on the stud shaft 77. The sleeve 30 is thus connected with the drum 34 so as to rotate therewith. By reason of the slots 31 which slidably engage the arms 32 the sleeve 30 is also adapted to be moved back and forth longitudinally on the shafts 26 and 77. The hub 33 of the drum 34 forms a mounting for one end of a coil spring 35 the other end of the spring bearing against the sleeve 30. The spring 35 yieldingly forces the sleeve 30 longitudinally to the right as observed in Fig. 7, or to the left as observed in Fig. 3 and thereby tends to keep the diametrically opposed rollers 37, which are mounted on the sleeve 30, positioned in the bottom of the concave depressions 66 of the annular flange 9. As a result of this arrangement, rotation of the drum 34 and the sleeve 30 therewith, can only be accomplished by causing the rollers 37 to follow the curved end portions of the annular flange 9, which form the edges of the cam projections 29. In thus following the annular flange 9 as a track, a camming action results which forces the sleeve 30 back longitudinally towards the drum 34 by compressing the spring 35. Continued rotation of the drum 34 and the sleeve 30 therewith will bring the rollers 37 to the tip of the cam projections 29 and cause them to travel thereover. The instant the rollers have passed the points of cam projections 29, the spring 35 will force the rollers 37 down the opposite curved side of the projection opposite to that up which they travelled. This return movement of the sleeve 30 and the rollers 37 forces disk 21 and the mercury tube 13, which is connected therewith, to rotate oppositely to the rotation of the drum 34, the movement of which actuates the various members and produces the snap action, the accomplishment of which is the object of the construction thus described. The cam projections 29 thereby cooperate with the rollers 37 to produce a camming action which translates the relatively slow motion of the drum 34 into an impulse movement which snaps the mercury tube 13 from horizontal to tilted position, and vice versa.

Figure 3:
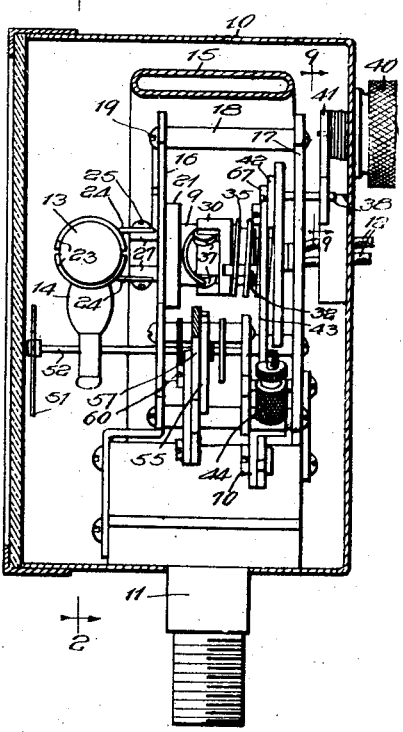
Fig. 3 is a view along the line 3—3 of Fig. 1.
Figure 4:
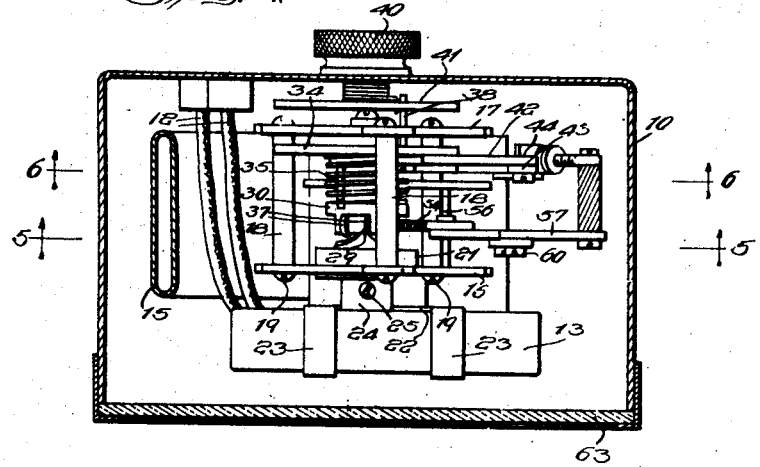
Fig. 4 is a view on a larger scale, taken along the line 4—4 of Fig. 1.

The drum 34 is connected with the Bourdon tube 15 by mechanism which causes rotation of the drum 34 to produce the impulse action of the circuit breaking device. Provision is also made for rotating the drum 34 manually when desired. For this purpose I have provided a pin 38 which projects through a slot 39 in the plate member 17. A knurled headed screw 40 is mounted on the rear of the casing 10 as best shown in Figs. 3 and 4. The screw 40 is rigidly connected to a segmental annular plate 41, the plate being symmetrically mounted upon the shank of the screw 40 in such a position that rotation of the screw in either direction will bring the inner curved edge of the plate 41 into contact with the pin 38. The screw 40 and the plate 41 are so positioned and mounted relative to the pin 38 that rotation of the screw and plate in either direction operates to move the pin 38 in its curved slot 39. This movement of the pin 38 back and forth in its slot 39 rotates the drum 34 upon which the pin 28 is eccentrically mounted. It is obvious that by rotating the screw 40 in one direction, the drum 34 and the sleeve 30, which is operatively connected with the drum, will be rotated to a position where the tube 13 is tilted, and that rotation of the screw 40 in the opposite direction will actuate the drum 34 and the sleeve 30, to rotate the tube 13 back to its horizontal position. By this means, the mercury tube 13 can be manually operated to open and close the circuit as desired.

The drum 34 is also rotatable by the action of the Bourdon tube 15 to which it is connected by means of a system of levers and arms hereinafter more particularly described. In all of the views except Fig. 6, the tube 13 is shown in horizontal position, in which position the sleeve 30 and the disk 21 occupy the relative positions shown in Fig. 7 with the rollers 37 each yieldingly held in the bottom of one of the concave depressions 66 situated between the cam projections 29. When the drum 34 is rotated on the shaft 77, either manually or by the action of the mechanism connecting it with the Bourdon tube 15, the sleeve 30 is caused to rotate therewith, as previously described. In thus rotating the sleeve 30 the camming action caused by the pressure of the rollers 37 against the sloped sides of the cam projections 29, forces the sleeve 30 longitudinally away from the disk 21 and tends to rotate the disk in the direction of rotation of the sleeve. The disk 21 is prevented from rotating in such direction by the position of the fingers 27 in the slots 28, one edge of the fingers bearing against the wall of the slot as shown in Fig. 10. When the rollers 37 have travelled over the point of the cam projections 29 as a result of the continued rotation of the drum 34 and of the sleeve 30, the spring 35 operates to force the sleeve longitudinally towards the disk 21 with the rollers in contact with the other side of the cam projections 29. The resulting camming action rotates the disk 21 in the opposite direction from that of the drum 34 the limit of such rotation being determined by the lengths of the slots 28 in which the fingers 27 move. The resulting rotation of the disk 21 carries with it the mercury tube 13 to its tilted position as shown in Fig. 6. Rotation of the drum 34 in the opposite direction from that described operates in the same way to snap the mercury tube 13 back to its horizontal position, and the fingers 27 into contact with the opposite edges of the slots 28.

The mechanism which operatively connects the drum 34 with the free end of the Bourdon tube 15 comprises a link 42, a lever 43, and an adjustable arm 44. The lever 43 is tiltably mounted on a shaft 45, the shaft being positioned or mounted on the plate members 16 and 17. Projecting lips 46 and 47 are formed on the under edge of the lever 43 to serve as stops which limit the amount of rotation of the lever 43, the lip 47 being brought into contact with one of the spacers 18 when the mechanism is moved to the position corresponding to the horizontal position of the mercury tube 13 and the lip 46 being brought in contact with the spacer 18 when the mechanism is moved to a position corresponding with the tilted position of the mercury tube 13.

The link 42 is pivotally connected to the drum 34 and to the lever 43 by pins 67 and 68 respectively. Rotation of the lever 43 thereby produces a corresponding rotation of the drum 34. The arm 44 is pivotally connected to the tube 15 by a pin 69 and at its other end the arm is both slidably and pivotally connected with the lever 43 by a pin 70 which extends through a slot 71 in the end of the lever. The slot 71 permits rotation of the lever 43 independently of the tube 15 when the drum 34 is actuated manually as hereinbefore described.

In the full line position of the Bourdon tube 15, as shown in Fig. 6, the tube has become contracted and has forced the lever 43 to its full line position with the lip 46 in contact with the spacer 18. In this full line position of the lever 43, the mercury tube 13 is horizontal, and in the dotted line position of the Bourdon tube 15, the mercury tube 13 is tilted. In the full line position of the Bourdon tube 15, which position corresponds to the closed circuit and a relatively low pressure in the energy system which the circuit breaker controls, it is to be noted that increased pressure in the Bourdon tube 15 tends to rectify or straighten out the tube while a drop in pressure tends to move its free end inwardly that is, to contract the tube. As the pressure increases the Bourdon tube 15 will tend to straighten and, upon reaching the dotted line position of Fig. 6, which corresponds to the maximum desired pressure in the system under control, the mercury tube 13 will be snapped to the tilted position and the circuit will be broken.

As already explained, the full line position of the Bourdon tube 15 and the mechanism connecting the tube with the drum 34 corresponds to the horizontal position of the mercury tube 13 and to the position of a relatively low or zero pressure in the pressure system, with which the spring 15 is operatively connected. In this horizontal position of the mercury tube 13 the mercury contained therein electrically connects the contact 14 to close the circuit through the conductors 12 and completes the circuit when the pressure is below a predetermined point in the pressure system. When by reason of the circuit being closed, the pressure in the connected system rises to a predetermined point, the tube 15 expands and actuates the arm 44, the lever 43, and the link 42 to rotate the drum 34 and to rock the mercury tube 13 into tilted position wherein the circuit is again broken. When the pressure again falls to a predetermined point following the breaking of the circuit, the resultant contraction of tube 15 again moves the lever 43 and link 42 to their full line position as shown in Fig. 6, such movement resulting in rotation of the drum 34 and the sleeve 33, and the snapping of the disk 21 and the tube 13 back to the horizontal position of the tube where the circuit is again closed.

For the purpose of indicating to the novice or inexperienced person that the circuit is broken or closed, I have provided an open ended arm 64 which is attached to the upper one of the stems 20 which form a part of the carrier member 20 and is rotatable with the member 20 in close proximity to the front face of the plate 16.

The words "On" and "Off" are etched or otherwise formed on the plate 16 in such a position that the arm 64 covers the word "Off" and exposes the word "On" to view through its open end when the tube 13 is horizontal and similarly covers the word "On" and exposes the word "Off" when the tube is tilted.

The pressure in the system with which the tube 15 is adapted to be operatively connected may vary between limits exceeding the pressure at which the circuit is automatically broken and a pressure which is less than that at which the circuit is automatically closed. An accurate indication of such pressure throughout its entire range is desirable, and for this purpose, an indicator is provided which is attached to the free end of the Bourdon tube 15 and is operable by the movement of the tube as it expands and contracts in accordance with the increase and diminution of pressure in the system.

An indicating pointer 51 is shown as fixedly mounted on a shaft 52, the shaft being pivotally mounted on the plate members 16 and 17. A pinion 53 is fixedly mounted on the shaft 52 in operative engagement with a sector of gear teeth 54 which is formed on the end of a rocker member 55. The rocker member 55 is rotatably mounted on a pin or shaft 56 and is operatively connected with the free end of the Bourdon tube 15 by a link 57. The rocker member 55 is formed in two parts and its length is adjustable by the provision of registering slots 58 in the two parts and a bolt 59 which clamps the parts together. The link 57 is similarly adjustable by being formed in two parts and provided with a bolt 60 which extends through the registering slots 61 and likewise clamps the parts together.

The front wall 63 of the casing 10 is of transparent material, preferably glass, upon the inner face of which is etched such gauge numerals and divisions as the pressure range requires. A hair spring 62 acts positively to hold the pointer 51 at zero reading when there is no pressure in the system. Expansion of the Bourdon tube 15 resulting from increase of the pressure therein moves the pointer 51 in clockwise direction and contraction of the tube operates to move the pointer in counter-clockwise direction thereby actuating the link 57 and the rocker member 55 and gear sector 54 to rotate shaft 52 and with it the pointer 51.

Figure 11:
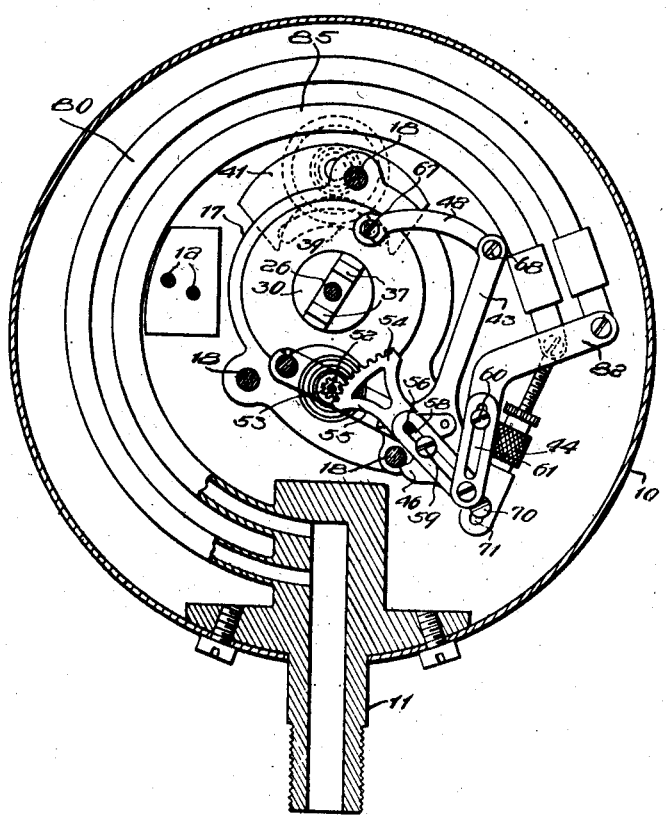
Fig. 11 is a sectional view through an alternative embodiment of my invention.

In Fig. 11 I have shown a sectional view of an alternative form of my device in which two of the Bourdon tubes numbered 80 and 85, respectively, are mounted. The tube 80 is operatively connected with the indicator pointer 51 by mechanism identical with and already described for the one tube mounting. Similarly, the Bourdon tube 85 is connected with the circuit breaking device by mechanism identical with that already described, except that for the link 57 I have substituted the link 82. Each of the Bourdon tubes 80 and 85 are connected with the stem 11 and expand and contract with variations in pressure in said stem, such expansion and contraction operating to independently actuate the indicator and the circuit breaker mechanisms.

In the single tube device already described, wherein the indicator and the circuit breaker mechanism are actuated by the same Bourdon tube, there is a slight lagging of the indicator pointer 51, as the rollers 37 are climbing over the cam projection 29. There is also a slight acceleration of the various interconnecting parts when the rollers 37 have passed over the point of the cam projection 29 and snap into the opposite position. While the retarding and accelerating effects tend to compensate it is found in practice that there is a slight permanent lagging of the indicator pointer 51 behind the actual pressure conditions in the piston with which the single tube is connected. This slight inaccuracy is not objectionable in indicators connected with low pressure systems, but in high pressure systems such, for example as hydraulic systems wherein the pressure ranges from 2,000 pounds to 20,000 pounds per square inch, it is desirable to eliminate even this slight inaccuracy which as a percentage is very small, yet in the total might amount to several hundred pounds in a high pressure system. In the two-tube device which I have shown in Fig. 11, the indicating device and the circuit breaking device being independently actuated by separate Bourdon tubes, all such irregularities in indication are eliminated, and a high degree of accuracy is obtained for indications of such high pressures.

For the foregoing reasons the one-tube device is found to be satisfactory in pressure systems having an upper range of 250 to 300 pounds. The two-tube device eliminates the possibility of any indicator inaccuracies in either high or low pressure systems, and enables the pressure conditions for both high and low pressure systems to be easily read not only within the range of pressures between the limits at which the circuit breaker is actuated but for any pressure outside of said limits.

Thus it will be seen that I have provided mechanism adapted for connection with a pressure energy system through a Bourdon tube whereby the gradual movement of said tube in accordance with variations in pressure in said system is transformed into an impulsive movement adapted to actuate an electrical circuit breaker at predetermined upper and lower limits of pressure, said mechanism being also operatively connected with an indicating mechanism operable to denote variations in pressure beyond and between predetermined upper and lower limits of pressure at which the circuit breaker is actuated.

Having thus described my invention, it is obvious that various immaterial modifications may be made in the same without departing from the spirit of my invention; hence I do not wish to be understood as limiting myself to the exact form, construction, arrangement, and combination of parts herein shown and described, or uses mentioned.

What I claim as new and desire to secure by Letters Patent is:

1. In a device of the kind described, the combination of a member mounted to rock, a second member mounted to rotate and be moved in the direction of its length relative to said first-named member camming mechanism operating when said second member is rotated to impulsively rock said first-named member between predetermined points, said mechanism comprising an open-ended cylindrical member having one end fastened to one of said members and the other end open, a pair of rollers mounted on the other of said members, the open end of said cylindrical member having a pair of oppositely positioned symmetrical cam projections formed thereon, said rollers being adapted to move over said free end of the cylindrical member as a track during relative rotation of said first and second-named members, and spring means yieldingly holding said rollers against said track.

2. In a device of the kind described, the combination of a member mounted to rock, a second member mounted to rotate and be moved in the direction of its length relative to said first-named member, camming mechanism operating, when said second member is rotated, to inpulsively rock said first-named member between predetermined points, said mechanism comprising an open-ended cylindrical member having one end fastened to one of said members and the other end open, a pairs of rollers mounted on the other of said members, the open end of said cylindrical member having a pair of oppositely positioned cam projections formed thereon, said rollers being adapted to move over said free end of the cylindrical member as a track during relative rotation of said first and second-named members, stop members positioned to limit the rotation of said first-named member between predetermined limits, and spring means yieldingly holding said rollers against said track.

3. In a device of the kind described, the combination of a member mounted to rock, a second member mounted to rotate and be moved in the direction of its length relative to said first named member and mechanism operating when said second member is rotated to rock said first-named member, comprising a hollow cylindrical member projecting from one of said members, the opposite semi-circumferential portions of the open end of said cylindrical member extending rearwardly and outwardly to form a pair of concaved camming surfaces terminating at diametrically opposite points, a pair of rollers suitably mounted on the other of said members to follow said camming surfaces as a track when said first and second named members are rotated relative to each other, and means yieldingly forcing said rollers into engagement with said camming surfaces.

4. In a device of the kind described, the combination of a member mounted to rock, a second member mounted to rotate and be moved in the direction of its length relative to said first named member, and mechanism, operating to rock said first named member, when said second member is rotated, comprising a hollow cylindrical member projecting from the first named member, said first and second named members having their axes of rotation longitudinally aligned and coincident with the longitudinal axis of the cylindrical member, the opposite semi-circumferential portions of the open end of said cylindrical member extending rearwardly and outwardly to form a pair of concaved camming surfaces terminating at diametrically opposite points, a pair of rollers suitably mounted on diametrically opposite points on the second member to follow said camming surfaces as a track when said second member is rotated, and means yieldingly forcing said rollers into engagement with said camming surfaces.

5. In a device of the kind described, the combination of a member mounted to rock, a second member mounted to rotate and be moved in the direction of its length relative to said first named member, and mechanism, operating to rock said first named member, when said second member is rotated, comprising a hollow cylindrical member projecting from the first named member, said first and second named members having their axes of rotation longitudinally aligned and coincident with the longitudinal axis of the cylindrical member, the opposite semi-circumferential portions of the open end of said cylindrical member extending rearwardly and outwardly to form a pair of concaved camming surfaces terminating at diametrically opposite points, a pair of rollers suitably mounted on diametrically opposite points on the second member to follow said camming surfaces as a track when said second member is rotated, means yieldingly forcing said rollers into engagement with said camming surfaces, and manually operable means adapted to rotate said second member.

6. In a device of the kind described, the combination of a member mounted to rock, a second member mounted to rotate and be moved in the direction of its length relative to said first named member, camming mechanism operating when said second member is rotated to impulsively rock said first named member, said mechanism comprising a pair of camming projections formed on one of said members, a pair of rollers mounted on the other of said members and so positioned as to move over said camming projections as a track during relative rotation of said members, spring means yieldingly holding said rollers against said camming projections, and manually operable means adapted to rotate said second member comprising a pin eccentrically mounted upon and operable to rotate said second member, a pivotally mounted segmental annular plate so positioned relative to said pin that rotation of the plate moves said pin to rotate said second member, and manually operable means rotating said annular plate.

In witness whereof I hereunto subscribe my name.

GUY S. FABER.